US008898244B2

(12) United States Patent
Miglore

(10) Patent No.: US 8,898,244 B2
(45) Date of Patent: Nov. 25, 2014

(54) SYSTEM AND METHOD FOR TRANSPORTING FILES BETWEEN NETWORKED OR CONNECTED SYSTEMS AND DEVICES

(76) Inventor: Allen Miglore, Latrobe, CA (US)

( * ) Notice: Subject to any disclaimer, the term of this patent is extended or adjusted under 35 U.S.C. 154(b) by 126 days.

(21) Appl. No.: 13/277,335

(22) Filed: Oct. 20, 2011

(65) Prior Publication Data

US 2013/0103786 A1 Apr. 25, 2013

(51) Int. Cl.
| | | |
|---|---|---|
| G06F 15/16 | (2006.01) |
| G06F 13/00 | (2006.01) |
| G06F 17/30 | (2006.01) |
| H04L 29/08 | (2006.01) |

(52) U.S. Cl.
CPC .............. *G06F 13/00* (2013.01); *G06F 17/30* (2013.01); *H04L 67/06* (2013.01)
USPC ........................................................ 709/209

(58) Field of Classification Search
CPC   G06F 12/0888; G06F 9/3016; G06F 12/3861
USPC .................. 709/247, 217, 214, 209
See application file for complete search history.

(56) References Cited

U.S. PATENT DOCUMENTS

| 5,091,846 | A | * | 2/1992 | Sachs et al. ................... 711/130 |
| 5,621,894 | A | * | 4/1997 | Menezes et al. ............. 709/227 |
| 6,134,583 | A | | 10/2000 | Herriot |
| 6,415,360 | B1 | * | 7/2002 | Hughes et al. ................ 711/139 |
| 6,604,168 | B2 | * | 8/2003 | Ogawa .......................... 711/103 |
| 6,651,141 | B2 | * | 11/2003 | Adrangi ........................ 711/118 |
| 7,136,866 | B2 | * | 11/2006 | Springer et al. ..................... 1/1 |
| 7,401,152 | B2 | * | 7/2008 | Traversat et al. ............. 709/230 |
| 7,509,423 | B2 | | 3/2009 | Douceur et al. |
| 7,539,867 | B2 | | 5/2009 | Bolosky et al. |
| 7,574,488 | B2 | * | 8/2009 | Matsubara ..................... 709/219 |
| 7,590,704 | B2 | * | 9/2009 | Yuan et al. ..................... 709/217 |

(Continued)

FOREIGN PATENT DOCUMENTS

| JP | 07-203177 | 8/1995 |
| JP | 09-097199 | 4/1997 |
| JP | 2004-005491 | 1/2004 |
| JP | 2006-172472 | 6/2006 |

OTHER PUBLICATIONS

PCT International Search Report, International Appl. No. PCT/US2012/060947, Mar. 27, 2013.

*Primary Examiner* — Kevin Bates
*Assistant Examiner* — Clarence D McCray
(74) *Attorney, Agent, or Firm* — Inventive Patent Law P.C.; Jim H. Salter

(57) ABSTRACT

A system and method for file transfer management are disclosed. An example embodiment includes: initiating a transfer of a file from a source system to a target system; deconstructing a file into logical components based on the format of the file; storing the cacheable logical components in a parent cache; generating an element list including a component identifier of the cacheable logical components; and delivering the element list to the target system. The example embodiment includes: receiving, at the target system the element list; determining if cacheable logical components are present in a child cache; fetching the cacheable logical components from the child cache; fetching other cacheable logical components and non-cacheable gap components from the source system; reconstructing the file by combining the fetched components; storing the missing cacheable logical components into the child cache; and delivering the reconstructed file to a destination.

22 Claims, 10 Drawing Sheets

(56) References Cited

U.S. PATENT DOCUMENTS

| | | | |
|---|---|---|---|
| 7,617,444 B2 * | 11/2009 | Rothschillwe et al. | 715/213 |
| 7,668,923 B2 * | 2/2010 | Herring et al. | 709/209 |
| 7,716,660 B2 * | 5/2010 | Mackay | 717/173 |
| 7,836,053 B2 | 11/2010 | Naef, III | |
| 7,899,990 B2 * | 3/2011 | Moll et al. | 711/118 |
| 7,903,292 B2 * | 3/2011 | Mickeleit | 358/426.08 |
| 7,921,184 B2 * | 4/2011 | Sundarrajan et al. | 709/217 |
| 7,941,585 B2 * | 5/2011 | Asher et al. | 711/101 |
| 8,255,456 B2 * | 8/2012 | Sundarrajan et al. | 709/203 |
| 8,351,715 B1 * | 1/2013 | Carmichael et al. | 382/232 |
| 2002/0007402 A1 * | 1/2002 | Huston et al. | 709/217 |
| 2003/0188008 A1 * | 10/2003 | Mickeleit | 709/232 |
| 2004/0054912 A1 | 3/2004 | Adent et al. | |
| 2007/0244987 A1 * | 10/2007 | Pedersen et al. | 709/217 |
| 2009/0259650 A1 | 10/2009 | Schuil | |
| 2010/0023693 A1 * | 1/2010 | Dilley et al. | 711/118 |
| 2010/0198797 A1 | 8/2010 | Wideman | |

\* cited by examiner

File Element List

| File Element Position | | File Element ID | |
|---|---|---|---|
| Position | Length | | |
| 501 | 10000 | 789DEF34... | Cached |
| 11001 | 50000 | 32415B6D... | Cached |
| 1 | 500 | | Gaps |
| 10501 | 500 | | Gaps |
| 61001 | 100 | | Gaps |
| 61101 | 2 | | Gaps |

| 770 | Parent Cache Content | |
|---|---|---|
| | File Element ID | File Element Data Content |
| | 789DEF34... | Macro Data |
| | 32415B6D... | Image Data |

Figure 7

| 780 | Child Cache Content | |
|---|---|---|
| | File Element ID | File Element Data Content |
| | 789DEF34... | Macro Data |
| | 32415B6D... | Image Data |

Figure 8

| 790 | Child Cache Content | | |
|---|---|---|---|
| | File Source ID | File Element ID | File Element Data Content |
| | Server A | 789DEF34... | Macro Data |
| | Server A | 32415B6D... | Image Data |

Figure 9

```
                  File Transfer Management Processing Logic
                                    -1001-
                                       │
                                       ▼
    Initiate, by use of a processor, a transfer of a file from a source system
                              to a target system.
                                    -1010-

▼
                          Identify a format of the file.
                                    -1020-

▼
   Deconstruct the file into a plurality of logical components based on the
     format of the file, the deconstructing including identifying a position
         of a logical component within the file, the plurality of logical
    components including at least one cacheable logical component and at
                    least one non-cacheable gap component.
                                    -1030-

▼
         Generate a plurality of component identifiers, each component
       identifier being unique to a particular logical component of the file.
                                    -1040-

▼
    Store the at least one cacheable logical component in a parent cache as
       indexed by the component identifier of the at least one cacheable
                              logical component.
                                    -1050-

▼
    Generate an element list including the component identifier of the at
   least one cacheable logical component, the position of the at least one
        cacheable logical component within the file, and information
   indicative of the at least one non-cacheable gap component within the
                                      file.
                                    -1060-

▼
                   Deliver the element list to the target system.
                                    -1070-
```

Figure 10

( End )

```
┌─────────────────────────────────────┐
│  File Transfer Management Processing Logic  │
│               -1101-                │
└─────────────────────────────────────┘
                    ▼
┌─────────────────────────────────────────────────────────────┐
│ Receive at a target system an element list comprising information related to a plurality of │
│ logical components corresponding to a file, the plurality of logical components including │
│ at least one cacheable logical component and at least one non-cacheable gap component, │
│   the element list including a component identifier of the at least one cacheable logical │
│     component, a position of the at least one cacheable logical component within the file, │
│   and information indicative of at least one non-cacheable gap component within the file. │
│                           -1110-                            │
└─────────────────────────────────────────────────────────────┘
                    ▼
┌─────────────────────────────────────────────────────────────┐
│ Determine if the at least one cacheable logical component is present in a child cache. │
│                           -1120-                            │
└─────────────────────────────────────────────────────────────┘
                    ▼
┌─────────────────────────────────────────────────────────────┐
│   Fetch the at least one cacheable logical component from the child cache using the │
│  component identifier, if the at least one cacheable logical component is present in the │
│                              child cache.                           │
│                           -1130-                            │
└─────────────────────────────────────────────────────────────┘
                    ▼
┌─────────────────────────────────────────────────────────────┐
│ Fetch the at least one cacheable logical component from a source system cache using the │
│   component identifier, if the at least one cacheable logical component is not present in │
│                              the child cache.                           │
│                           -1140-                            │
└─────────────────────────────────────────────────────────────┘
                    ▼
┌─────────────────────────────────────────────────────────────┐
│      Fetch the at least one non-cacheable gap component from the source system.      │
│                           -1150-                            │
└─────────────────────────────────────────────────────────────┘
                    ▼
┌─────────────────────────────────────────────────────────────┐
│  Reconstruct the file by combining the fetched at least one cacheable logical component │
│      and the fetched at least one non-cacheable gap component using the element list │
│                              information.                           │
│                           -1160-                            │
└─────────────────────────────────────────────────────────────┘
                    ▼
┌─────────────────────────────────────────────────────────────┐
│   Store the at least one cacheable logical component into the child cache, if the at least │
│            one cacheable logical component is not present in the child cache.           │
│                           -1170-                            │
└─────────────────────────────────────────────────────────────┘
                    ▼
┌─────────────────────────────────────────────────────────────┐
│                Deliver the reconstructed file to a destination.                │
│                           -1180-                            │
└─────────────────────────────────────────────────────────────┘
                    ▼
                 ( End )
```

Figure 11

SYSTEM AND METHOD FOR TRANSPORTING FILES BETWEEN NETWORKED OR CONNECTED SYSTEMS AND DEVICES

COPYRIGHT

A portion of the disclosure of this patent document contains material that is subject to copyright protection. The copyright owner has no objection to the facsimile reproduction of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2010-2011 Allen Miglore, All Rights Reserved.

TECHNICAL FIELD

This patent application relates to a system and method for use with networked or connected file sources, according to one embodiment, and more specifically, for transporting files between networked or connected systems and devices.

BACKGROUND

Many file formats are designed as composite data files, to store multiple types of data supporting the presentation or printing of a related document. For example, print files in formats such as PCL (Printer Command Language), PostScript, EMF (Enhanced Metafile), XPS (Extensible Markup Language—XML Paper Specification), and PDF (Portable Document Format) often contain not just text and drawing instructions, but also discrete data objects such as fonts, images, printer macros, and other elements. In addition, a composition of large amounts of text could represent a standardized element that would be present in multiple documents; so long streams of textual content would also represent a discrete data object. Likewise, data formats such as XML (Extensible Markup Language) can contain large payload data, such as images, videos, animations, audio, or embedded files, in addition to tags and variable textual data. Other file formats include container files, such as files based on zip files (Winzip) or tar archives (originally a Unix format and command). Some examples of container files include the already-mentioned XPS document file, Java's "jar" file, various ebook formats, such as OCF, MusicXML, and other file types. Such container files can contain font files, image files, executable code files, audio files, and other resources.

As single files, these documents can be easily transported between systems, or from systems to devices. However, these files can become quite large and therefore time consuming to transport in a low-bandwidth environment, or potentially costly to transport when charges apply to the amount of data transported, or when additional network capacity must be purchased to accommodate document transport in a timely manner.

BRIEF DESCRIPTION OF THE DRAWINGS

The various embodiments is illustrated by way of example, and not by way of limitation, in the figures of the accompanying drawings in which:

FIG. 6 illustrates a sample of the file element list produced by the file transfer management system, of an example embodiment;

FIGS. 7-9 illustrate a sample of the cache contents produced by the file transfer management system of an example embodiment;

FIGS. 10-11 are processing flow diagrams illustrating example embodiments of the processing performed by the file transfer system as described herein;

DETAILED DESCRIPTION

Figure 1:
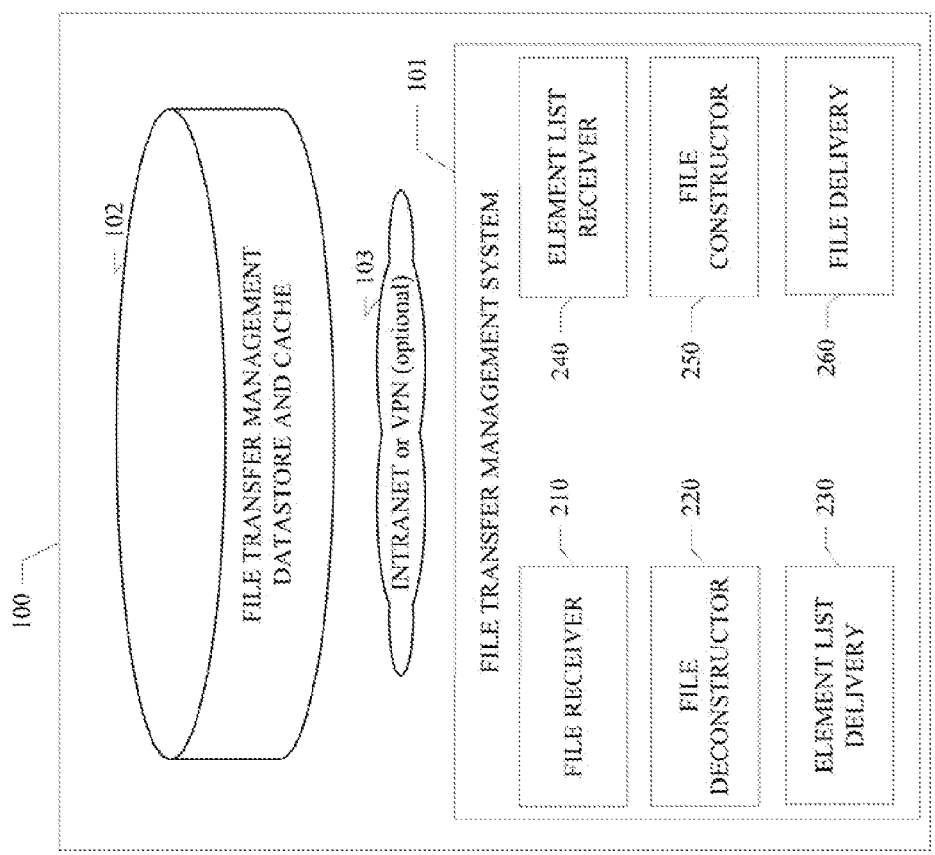
FIG. 1 illustrates an example embodiment of a file transfer management host.

In the following description, for purposes of explanation, numerous specific details are set forth in order to provide a thorough understanding of the various embodiments. It will be evident, however, to one of ordinary skill in the art that the various embodiments may be practiced without these specific details.

In the case of the transport of an entity's files between any two locations, savings can result from using software designed to minimize the amount of data that must be transported over the low-bandwidth or costly portion of the network or other data connection. The embodiments described herein accomplish this through a combination of data compression and caching techniques, leveraging the concept that certain data objects within files produced or used by one or a multitude of organizations, individuals, or other entities may be repetitively used in multiple files. For example, an organization may utilize the same image files and fonts for every invoice document they produce; so, it would be possible to transport that data only once between two systems, and therefore save the cost associated with repeated transport of this duplicate data. In other examples, customers of a given entity, users of a given website, or any recipients of a particular file may benefit from cost savings associated with suppressing the repeated transport of any duplicate data. The embodiments described, herein can be beneficial anywhere there is a likelihood for repeated transfer of file elements between two systems.

The embodiments described herein capture files destined for a remote system or device, deconstruct each file into logical data elements, provide the remote system with identification of the logical data elements, and allow the remote system to obtain those logical data elements not previously stored, as well as data segments that are not part of a logical data element. The remote system then re-constructs the files for local storage or delivery to local devices. Finally, the remote system locally stores the logical data elements, so the remote system need not re-transport those elements. The result is that logical data elements that are present in multiple files need only be transported a single time to the remote system.

As described herein, the term, "file" or "files" can represent any data structure, data object, information component, executable, text, graphics data, audio or video clip, binary image, or any other type of data component. As well known in the art, files are often formatted in a manner that is more easily processed by a particular processing component, software application, or the like. In some cases, the conventional file formats provide the definition for a composite data file structure that includes a set of logical file components or logical data elements within the particular file format. Given the type of file format for a particular file, the corresponding file format structure can be used to identify the logical data elements within the particular file.

Figure 4:
FIG. 4 illustrates an example of a composite data file representing a common file format.

For example, FIG. 4 illustrates a standard composite file format, that combines several logical data elements within the particular file to form a complete single file structure 400. The logical data elements comprising file 400, in this example, include: a file header 401, a macro data block 402, a first text data block 403, an image data block 404, a second text data block 405, and a file footer 406. Such a file format can be used, for example, with a PCL file. It will be apparent to those of ordinary skill in the art that a variety of other file formats employ a block structure or logical data element structure as shown in FIG. 4.

The embodiments described herein might be compared to the familiar use of cache by web browsers or proxies, where files that are used to compose an HTML (Hypertext Markup Language) document presentation, such as the base HTML and referenced images, CSS (Cascading Style Sheets) files, JavaScript libraries, and so on, can be stored locally on the browser machine to prevent the need to download the files again. However, the embodiments described herein differ significantly, in that the data to be cached is parsed and extracted from single-file structures, and the file must be re-constructed at a remote location from previously unknown and cached portions. Rather than caching whole files, logical portions of files are cached in the various embodiments described herein. The embodiments described herein are designed to minimize delivery cost and time to transport files to devices and archive locations across a network or between connected devices in real time.

Referring to FIG. 1, an example embodiment of a file transfer management host 100 is illustrated. In one embodiment, the file transfer management host 100 can include a datastore and cache 102. The datastore and cache 102 can be any conventional data repository including a magnetic or hard disk system, a RAID (Redundant Array of Independent Disks) system, a flash memory array, or any other system for data storage. The file transfer management host 100 is shown to include a file transfer management system 101. The file transfer management system 101 can be a software system comprising a set of functional processing components or modules implemented in software, firmware, or hardware, or combinations thereof. In one embodiment, the set of functional processing components or modules of file transfer management system 101 can include file receiver 210, file deconstructor 220, element list delivery module 230, element list receiver 240, file constructor 250, and file delivery module 260. As will be described in more detail below, the file receiver 210, file deconstructor 220, and element list delivery module 230 are used when the file transfer management host 100 is acting as a source system, which processes a requested file for transfer to a target system. Conversely, the element list receiver 240, file constructor 250, and file delivery module 260 are used when the file transfer management host 100 is acting as a target system, which processes a requested file received from a source system. The details of this set of functional processing components or modules of file transfer management system 101 are provided below.

In one embodiment, the file transfer management host 100 may optionally include an interface to an intranet or Virtual Private Network (VPN) 103, which can be used to internally network the file transfer management host 100 to other nodes of an intranet or VPN. For example, an enterprise or organization having multiple processing systems can network the processing systems together via a closed and secure internal network. Given that many such enterprises or organizations may use a common, set of files or documents, the file transfer functionality provided by the embodiments described herein may be particularly useful in environments in which an intranet or VPN is used. However, the use of an intranet or VPN is not essential to the operation of the embodiments described herein.

Figure 2:
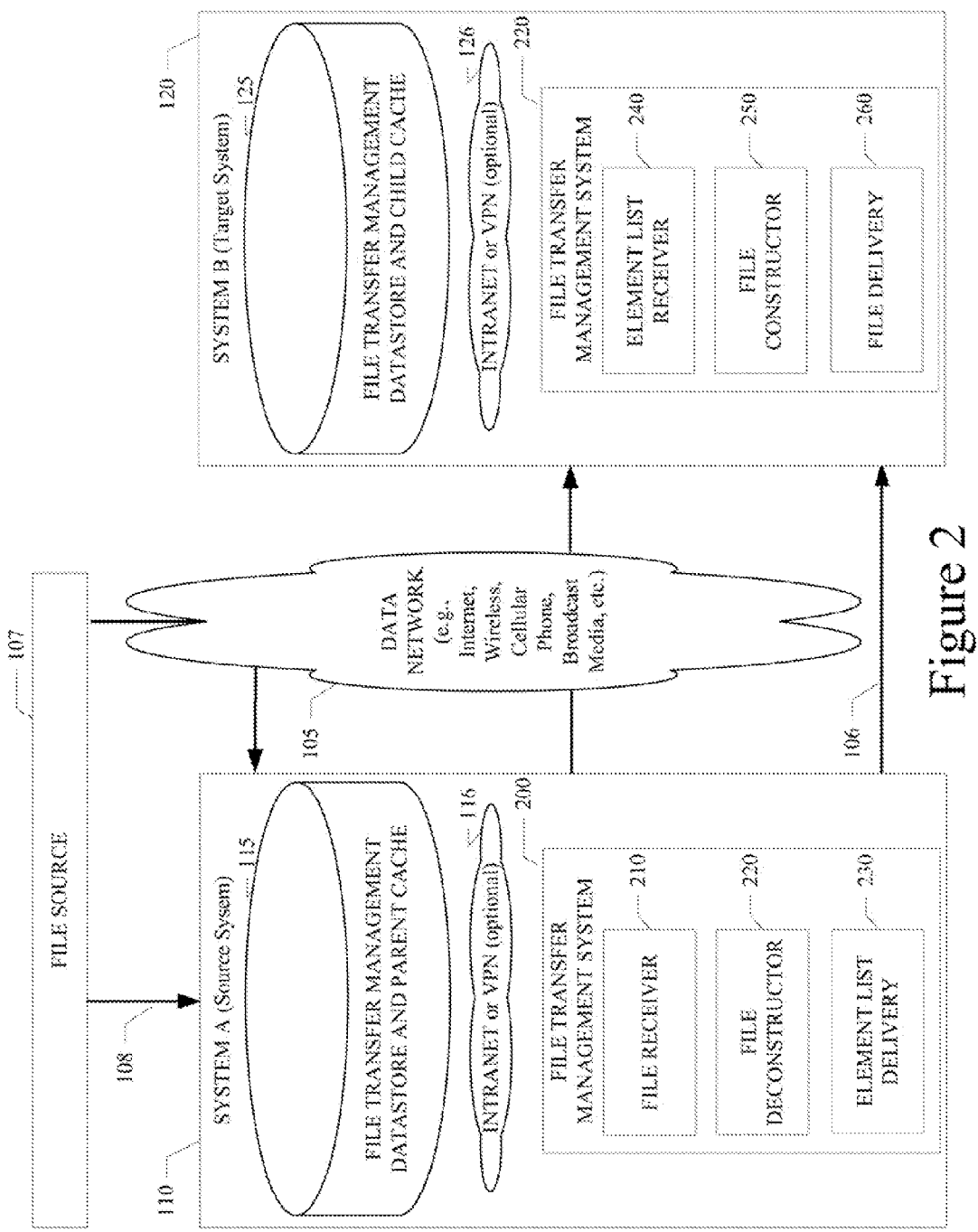
FIG. 2 illustrates an example embodiment of a networked system in which various embodiments may operate.

Referring to FIG. 2, in an example embodiment, a networked and/or connected system for transporting files between data processing systems in an example embodiment is disclosed, in various example embodiments, a file transfer management application or service, sometimes operating on a server, is provided to simplify and facilitate file transfers between a file source system and a target system. In the example shown in FIG. 2, a source system 110 is shown in data communication, with a target system 120. Source system 110 and target system 120 can represent any type of computing, data processing, or communication device, which can store and execute the data processing functionality described herein. Source system 110 and target system 120 can also represent any type of computing, data processing, or communication device, between which file data can be transferred. In one embodiment, the source system 110 can be a server and the target system 120 can be a client computing system. In another embodiment, the source system 110 can be a client computing system and the target system 120 can be a rendering device, such as a printer or a display device. In yet another embodiment, the source system 110 and the target system 120 can be network routers. In yet another embodiment, the source system 110 can be a broadcast head-end and the target system 120 can be a set-top box. Thus, it is apparent that the file transfer management functionality described herein can be implemented in a wide variety of computing, data processing, and/or communication devices. As shown in FIG. 2, the source system 110 and the target system 120 are shown to include only a portion of the functional components within file transfer management systems 200 and 220 for clarity. It will be apparent that each of these systems (200 and 220) can include the set of functional processing components or modules of file transfer management system 101 illustrated in FIG. 1 and listed above, The term "systems" as used herein can be taken to include any two or more computing machines or network devices with the ability to run programs capable of communicating over a network or a direct data connection, deconstructing and reconstructing files, and storing cached logical file elements. This clearly works for two or more computers, but would also work between any other devices with internal processors and storage, such as print servers, routers, phone and tablet devices, printers with onboard software, and the like.

The data communication between source system 110 and target system 120 can be provided by interfaces to a data network 105, such as the internet, a wireless network, cellular data networks, broadcast media networks, or any other conventional computer or device networking technology. Additionally, data communication between source system 110 and target system 120 can be provided by a direct connection, such as an Ethernet connection, Firewire, USB, intranet, Bluetooth, localized wireless, or any other conventional direct data communication technology for computer or device interconnection. As shown in FIG. 2, source system 110 may communicate with target system 120 via network 105 and/or a direct connection 106.

File source 107 represents any of a wide variety of file sources, which can provide any of a plurality of files for transfer to a target system 120. In many cases, a user may select a file for transfer to the user at a target system 120. In other cases, files can be transferred automatically using either a push or pull data transfer methodology. It will be apparent to those of ordinary skill in the art that file source 107 can be any of a variety of networked or directly connected file providers, such as on-line libraries, archives, e-commerce sites, websites, document repositories, email services, social network sources, broadcast media sources, content aggregators, and the like as described in more detail below. As shown in FIG. 2, the source 107 and source system 110 may communicate and transfer files and information via the data network 105 or via a direct connection 108. As described above, the direct connection 108 can be provided by any of a variety of conventional technologies, such as an Ethernet connection, Firewire, USB, intranet, Bluetooth, localized wireless, or any other conventional computer or device direct data connection technology. As also described above, various components within the source system 110 and target system 120 can also communicate internally via an optional conventional intranet or local area network (LAN) 116 and 126.

The file source 107 may include any of a variety of providers of network or direct connect transportable digital content. The transportable digital content may be arranged in files in one of a variety of standard file formats. Any electronic file format, such as HTML/XML (Hypertext Markup Language/Extensible Markup Language), open/standard, file formats, PCL (Printer Command Language), PostScript, EMF (Enhanced Metafile), XPS (Extensible Markup Language—XML Paper Specification), Portable Document Format (PDF), audio (e.g., Motion Picture Experts Group Audio Layer 3—MP3, and the like), video (e.g., MP4, and the like), and any proprietary or open source interchange format defined by specific content sites can be supported by the various embodiments described herein. The transportable digital content may also be arranged in container files, such as files based on zip files (Winzip) or tar archives (originally a Unix format and command). Some examples of container files include the already-mentioned XPS document file, Java's "jar" file, various ebook formats, such as OCF, MusicXML, and other file types. Such container files can contain font files, image files, executable code files, audio files, and other resources. Syndicated content can also be supported by the various embodiments described herein. Syndicated content includes, but is not limited, to such content as news feeds, events listings, news stories, blog content, headlines, project updates, excerpts from discussion forums, business or government information, and the like. A file transfer or feed mechanism may include a push mechanism, a pull mechanism, a download mechanism, a streaming mechanism, a polling mechanism, or other content or file transfer mechanism.

Networks 105, 116, and 126 are configured to couple one computing device with another computing device. Networks 105, 116, and 326 may be enabled to employ any form of computer readable media for communicating information from one electronic device to another. Network 105 can include the Internet, a wireless network, cellular data networks, broadcast media networks, wide area networks (WANs), or any other conventional computer or device networking technology. Networks 116 and 126 can include a conventional intranet, local area network (LAN), an interconnected set of LANs, wireless network, cellular data networks, or any other conventional computer or device networking technology. On an interconnected set of LANs, including those based on differing architectures and protocols, a router or gateway can act as a link between LANs, enabling messages and files to be sent between computing devices. Also, communication links within LANs may include twisted wire pair or coaxial cables, while communication links between wide-area networks may utilize digital or analog telephone lines, full or fractional dedicated digital lines including T1, T2, T3, and T4, Integrated Services Digital Networks (ISDNs), Digital User Lines (DSLs), wireless links including satellite links, or other communication links known to those of ordinary skill in the art. Furthermore, remote computers and other related electronic devices can be remotely connected to either LANs or WANs via a modem and temporary telephone link.

Networks 105, 116, and 126 may further include any of a variety of wireless sub-networks that may further overlay stand-alone ad-hoc networks, and the like, to provide an infrastructure-oriented connection. Such sub-networks may include mesh networks, Wireless LAN (WLAN) networks, cellular networks, and the like. Networks 105, 116, and 126 may also include an autonomous system of terminals, gateways, routers, and the like connected by wireless radio links or wireless transceivers. These connectors may be configured to move freely and randomly and organize themselves arbitrarily, such that the topology of networks 105, 116, and 126 may change rapidly.

Networks 105, 116, and 126 may further employ a plurality of access technologies including 2nd (2G), 2.5, 3rd (3G), 4th (4G) generation radio access for cellular systems, WLAN, Wireless Router (WR) mesh, and the like. Access technologies such as 2G, 3G, 4G, and future access networks may enable wide area coverage for mobile devices, such as one or more of target devices 120, with various degrees of mobility. For example, networks 105, 116, and 126 may enable a radio connection through a radio network access such as Global System for Mobile communication (GSM), General Packet Radio Services (GPRS), Enhanced Data GSM Environment (EDGE), Wideband Code Division Multiple Access (WCDMA), CDMA2000, and the like. Networks 105, 116, and 126 may also be constructed for use with various other wired and wireless communication protocols, including TCP/IP, UDP, SIP, RTP, CDMA, TDMA, EDGE, UMTS, GPRS, GSM, UWB, WiMax, IEEE 802.11x, WUSB, and the like, in essence, networks 105, 116, and 126 may include virtually any wired and/or wireless communication mechanisms by which information may travel between one computing device and another computing device, network, and the like. In one embodiment, network 114 may represent a LAN that is configured behind a firewall (not shown), within an enterprise, for example.

In an example embodiment as shown in FIG. 2, target system 120 enables a user to access files from the file source 107 via the source system 110 and network 105 or direct connection 106. Target system 120 may include virtually any computing device that is configured to send and receive information over a network, such, as network 120, or a direct connection 106. Such target systems 120 may include client computers, portable devices, cellular telephones, smart phones, radio frequency (RF) devices, global positioning devices (GPS), Personal Digital Assistants (PDAs), handheld computers, wearable computers, tablet computers, integrated devices combining one or more of the preceding devices, and the like. Target systems 120 may also include other computing devices, such as personal computers, multiprocessor systems, microprocessor-based or programmable consumer electronics, network PC's, rendering devices, printers, display devices, and the like. As such, target systems 120 may range widely in terms of capabilities and features. In one embodiment, the target systems 120 may include a browser application enabled to employ HyperText Markup Language (HTML), Dynamic HTML, Handheld Device Markup Language (HDML), Wireless Markup Language (WML), WMLScript, JavaScript, EXtensible HTML (xHTML or XML), Compact HTML (CHTML), and the like, to receive and display files and information to a user.

Referring still to FIG. 2, a source system 110 of an example embodiment is shown to include a file transfer management system 200, optional intranet 116, and datastore/parent cache 115. File transfer management system 200 can include file receiver 210, file deconstructor 220, and element list delivery module 230. Each of these modules can be implemented as software components executing within an executable environment of file transfer management system 200 operating on host source system 110. Each of these modules of an example embodiment is described in more detail below in connection with the figures provided herein. In general, file receiver 210 is responsible for obtaining a file from the file source 107. The received file can be arranged as a composite data file as with many conventional file formats as described above. The file deconstructor 220 of an example embodiment is responsible for partitioning the received file into its component parts, based on the associated file format. The file deconstructor 220 produces an element list that describes the component parts of the received file. Finally, the element list delivery module 230 is responsible for delivering the element list to a target system 120. As explained above, the element list can be delivered to the target system 120 from the source system 110 via network 105 or via a direct connection 106.

Referring still to FIG. 2, a target system 120 of an example embodiment is shown to include a file transfer management system 220, optional intranet 126, and datastore/child cache 125. File transfer management system 220 can include element list receiver 240, file constructor 250, and file delivery module 260. Each of these modules can also be implemented as software components executing within an executable environment of file transfer management system 220 operating on host target system 120. Each of these modules of an example embodiment is described in more detail below in connection with the figures provided herein. In general, element list receiver 240 is responsible for obtaining an element list from a source system 110. The element list describes the component parts of the file to be transferred to the target system 120. The file constructor 250 of an example embodiment is responsible for combining or appending the component parts of a file, as defined by the element list, into a complete single file. The file constructor 250 produces a complete single file based on the element list that describes the component parts of the file. Finally, the file delivery module 260 is responsible for delivering the complete file to a consuming system, user, or device.

Figure 3:
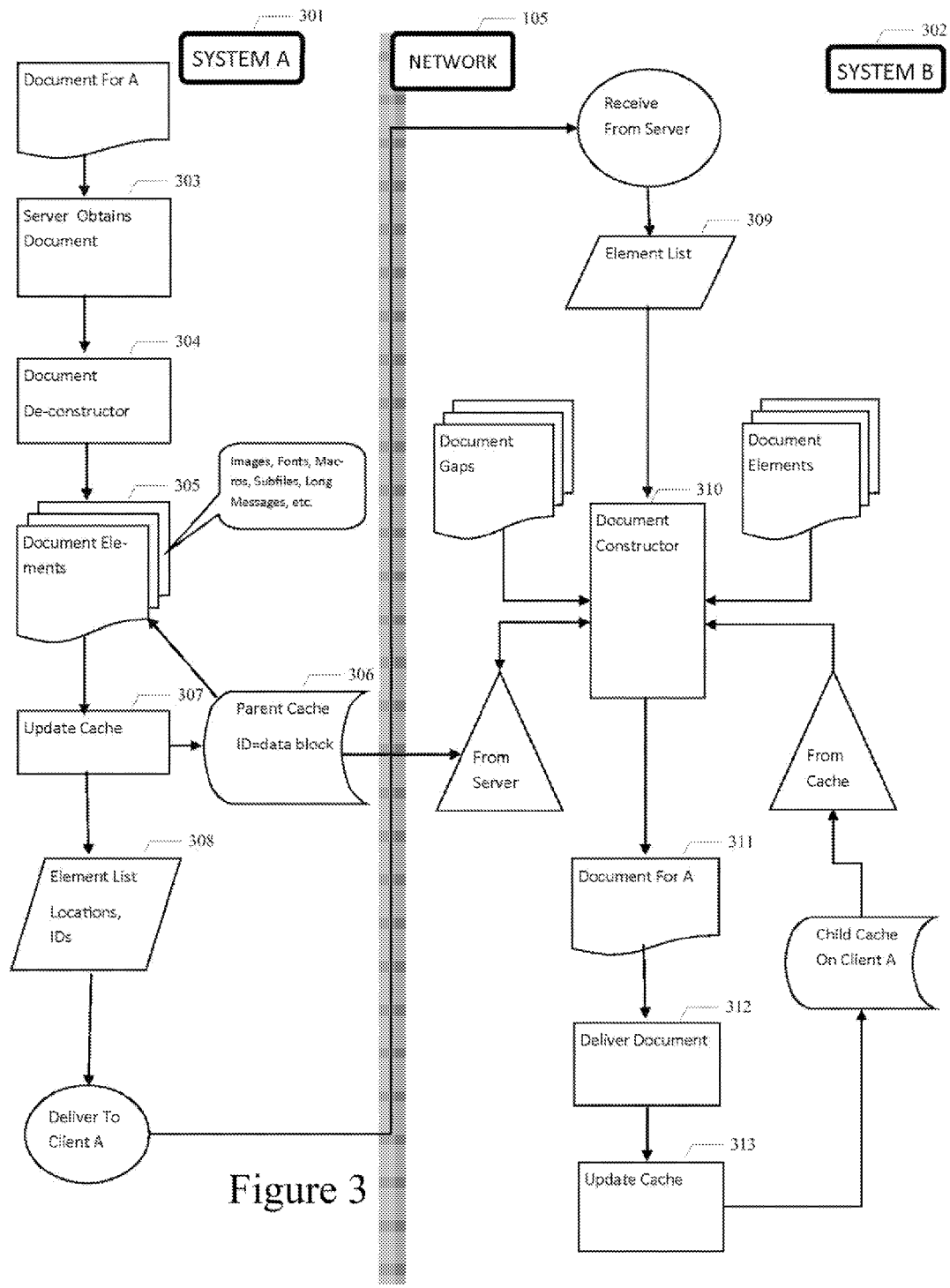
FIG. 3 illustrates a processing flow for an example embodiment of the file transfer management system.

FIG. 3 illustrates a processing flow performed by the file transfer management system 101 of an example embodiment as described herein. The method of an example embodiment includes steps for efficiently transferring a file from a source system 301 to a target system 302 using the functional components illustrated in FIGS. 1 and 2. An example scenario, shown in FIG. 3, is described in detail below.

Referring to FIG. 3 in a particular example embodiment, system A 301 hosts an accounting system, for example. System A 301 corresponds to the source system 110 illustrated in FIG. 2. System B 302, for example, can host printers and can display local information to the users of the accounting system. As users in this sample scenario run the accounting system on system A 301, the users can print documents, which must be transported across the network 105 and delivered to the printers connected to system B 302. If system A 301 and system B 302 are connected over a slow or costly network 105, it is beneficial to reduce the amount of data transported for the print jobs.

To accomplish this reduction in the amount of data transported, software implementing the file transfer management system 101 of an example embodiment can be installed on system A 301 and system B 302. In particular, the functional components included in source system 110 shown in FIG. 2 can be installed in system A 301. Similarly, the functional components included in target system 120 shown in FIG. 2 can be installed in system B 302. As a result, the following processing operations can be supported by the various embodiments described herein:

1. The file transfer management system 200 on system A 301 can run and await the arrival of files from file source 107, using various techniques, including socket, or pipeline streams, spool file capture, or file system monitoring.
2. The file transfer management system 220 on system B 302 can run and connect to file transfer management system 200 on system A 301 via a network 105 connection. Alternatively, the file transfer management system 220 on system B 302 can run and connect to file transfer management system 200 on system A 301 via a direct data connection 106. The file transfer management system 220 on system B 302 awaits notification of files destined for system B 302 devices or file system.
3. The file transfer management system 200 on system A 301 can capture files, using techniques previously suggested at operation 303 shown in FIG. 3. The file receiver component 210, shown in FIG. 2, can be used for this purpose. The captured file, based on configuration, is to be delivered to a device or file system on system B 302.
4. The file transfer management system 200 on system A 301 can identify the format of the captured file. For example, the file format can be identified as PostScript, EMF, XPS, PCL, PCL-XL, PDF, or any of a variety of conventional file formats. Depending on the identified file format, file transfer management system 200 can deconstruct the file into logical file elements, such as fonts, images, printer macros, embedded files, long text streams, and the life, in operations 304 and 305. The file deconstructor component 220, shown in FIG. 2, can be used for this purpose.
5. The file deconstructor component 220 can generate a component identifier for each of the logical file elements comprising the deconstructed file. In one example embodiment, the file deconstructor component 220 can calculate a fingerprint hash, such as a conventional MD5 hash, for each logical file element. The file deconstructor component 220 can also generate position of location information that specifies a position/location of each logical file element within the file. In some cases, a shorter hash function, such as CRC-32, can be used successfully in order to reduce the hash size and therefore reduce file transport overhead.
6. Using the component identifier for each of the logical file elements comprising the deconstructed file, the file transfer management system 200 consults a parent cache 115 on system A 301 to determine if each of the logical file elements needs to be added to the parent cache 115. Further, the file transfer management system 200 can ensure the component identifier for each of the logical file elements uniquely identifies the logical file element data by performing a binary comparison with existing cached elements. In the very rare cases where the same component identifier is generated from different data the component identifier can be adjusted with a sequencer. The sequencer adds a sequence value to the component identifier to ensure uniqueness of the component identifier. The component identifier, combined with the sequence value if needed, represents a unique component identifier or "fingerprint ID" corresponding to the logical file element data for each of the logical file elements of the deconstructed file.

7. The file transfer management system 200 can store logical file element data into the parent cache 115 on system A 301, in operations 306 and 307. Each logical file element can be identified by its unique component identifier. Storage of a particular logical file element can be bypassed if the particular logical file element, is already resident in the parent cache 115 based on its unique component identifier. Each logical file element can also be classified as cacheable or non-cacheable. This classification can be made based on the type of logical file element as determined from the file format during the file deconstruction process. Cacheable logical file elements are generally those elements that are likely to be re-useable across multiple file requests. Non-cacheable logical file elements are generally those elements that include unique or specific data that is unlikely to be re-useable across multiple file requests. Examples of cacheable logical file elements include font definitions, macros, static text or image data, and other forms of generally invariant data. Examples of non-cacheable logical file elements include certain blocks of text or image data, variable data, or other forms of dynamic or specific data. As used herein, the term, "gap" or "gap data" refers generally to non-cacheable logical file elements.

8. In operation 308, the file transfer management system 200 can create an element list including information related to the logical file elements corresponding to the deconstructed file. The element list can include the unique component identifier and the position/location information for each of the logical file elements of the deconstructed file. The element list can also include the classification for each logical file element that specifies whether the element is cacheable or gap data. In an alternative embodiment, the element list can include the gap data itself. The element list delivery component 230 can deliver the element list to the file transfer management system 220 on system B 302.

9. In operation 309, the file transfer management system 220 on system B 302 receives the element list from the file transfer management system 200 on system A 301. The element list receiver component 240, shown in FIG. 2, can be used for this purpose. Again, the element list can be transferred to system B 302 via network 105 or direct data connection 106.

10. In operation 310, the file transfer management system 220 can analyze the element list and perform among the following operations: 1) determine if the component identifiers listed in the element list correspond to logical file elements resident in a child cache 125 of system B 302 (i.e., locally cached logical file elements); 2) determine which of the component identifiers listed In the element list correspond to logical file elements not resident in or missing from the child cache 125 (i.e., remotely cached logical file elements); 3) determine which of the component identifiers listed in the element list correspond to gap data (i.e., non-cacheable logical file elements); 4) fetch the logical file elements not resident in or missing from the child cache 125 (i.e., the remotely cached logical file elements) from the file transfer management system 200 on system A 301; and 5) fetch the logical file elements classified as gap data (i.e., the non-cacheable logical file elements), which are needed to construct the file, from the file transfer management system 200 on system A 301. The file constructor component 250, shown in FIG. 2, can be used for this purpose.

11. In operation 311, the complete single file can be reconstructed by the file transfer management system 220, using the locally cached logical file elements, the fetched remotely cached logical file elements, and the fetched non-cacheable logical file elements. The file constructor component 250, shown in FIG. 2, can be used for this purpose.

12. In operation 312, the complete file can be delivered by the file transfer management system 220 to the destination user, device, file system, or spooler (e.g., a local printer). The file delivery component 250, shown in FIG. 2, can be used for this purpose.

13. In operation 313, the file transfer management system 220 can store the fetched remotely cached logical file elements into the local child cache 125 using the component identifier as a unique identifier for each of the locally cached logical file elements. Once the fetched remotely cached logical file elements are stored into the local child cache 125, these elements become locally cached logical file elements. Thus, when a next file request includes a request for one of these locally cached logical file elements, a network access or a direct data connection access will not be necessary to obtain these locally cached logical file elements. In this manner, the cost of servicing the next file request can be beneficially reduced.

Figure 5:
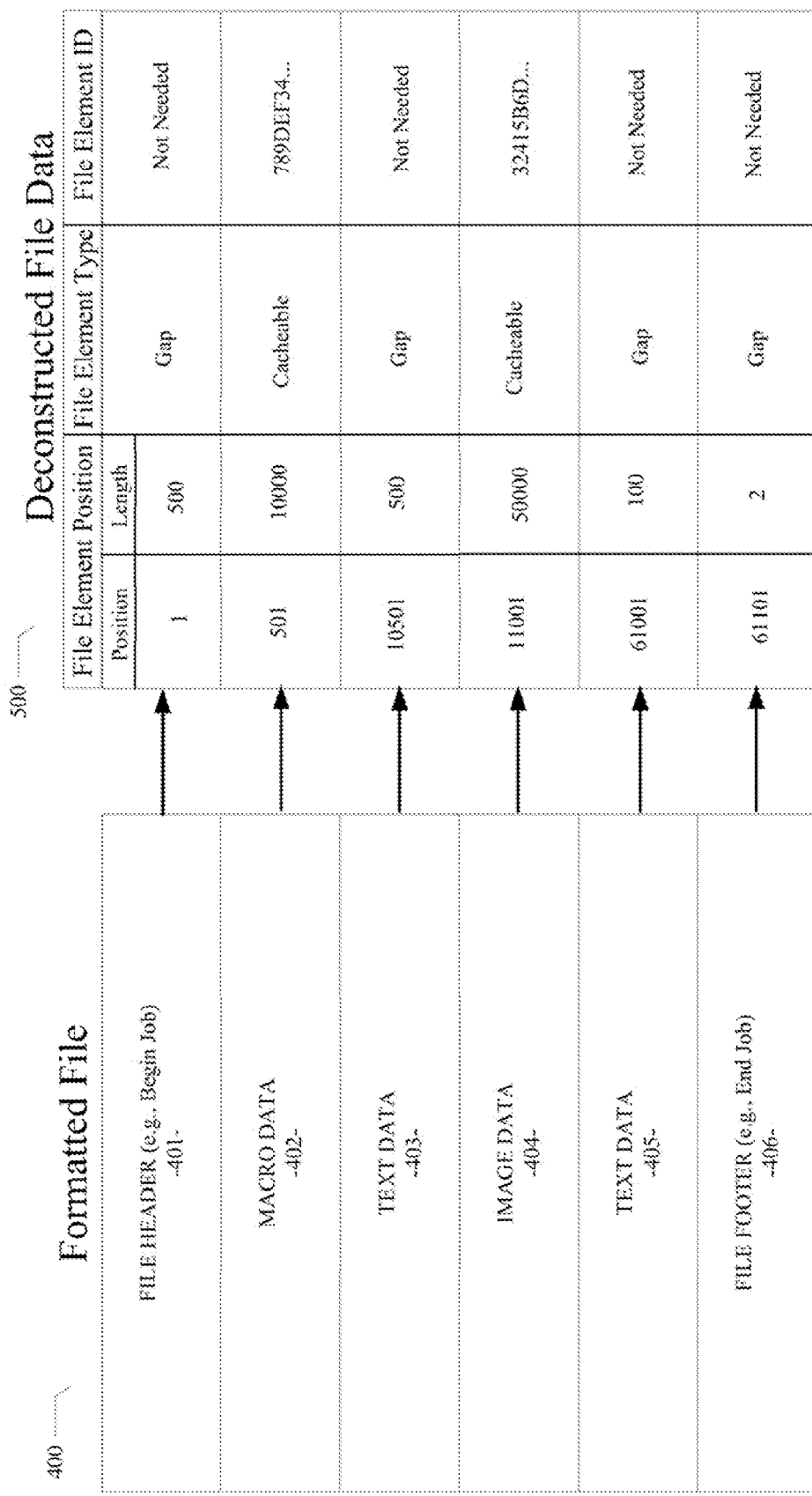
FIG. 5 illustrates a sample of the deconstructed file data set produced by the file transfer management system of an example embodiment.

Referring now to FIG. 5, the processing performed on a standard formatted file 400 by the file deconstructed module 220 of an example embodiment is illustrated. As shown, a standard file format 400 can be received as an input to the file deconstructor module 220. The particular format of the received file can be determined using well-known techniques. The file format information can be used to identify the logical data elements (401-406) that comprise the received file 400. The file deconstructor module 220 of an example embodiment can produce deconstructed file data 500 from the received file and the file format information. For each of the logical data elements (401-406) that comprise the received file 400, the file deconstructor module 220 can generate deconstructed file data including: 1) the position of the logical data element in the file 400, 2) a classification as to whether the logical data element is cacheable or non-cacheable (gap data), and 30 a unique component identifier of the logical data element. If a particular logical data element is non-cacheable, it would not be necessary to generate the component identifier for these non-cacheable logical data elements. An example of each of these items of deconstructed file data is shown in FIG. 5. In one embodiment, the logical element position with the file 400 can be represented as a starting byte location and a byte length as shown in FIG. 5. In one embodiment, the logical element classification or element type can be represented as an indication of whether the logical file element is cacheable or gap data. In one embodiment, the logical file element ID or unique component identifier can be represented as a hash value as described herein.

Referring now to FIG. 6, the element list of an example embodiment is illustrated. As shown, an element list 600, as generated in the manner described herein, is shown to include a logical file element position and unique component identifier for each of the cached logical file elements. A logical file element position is also provided for each of the non-cached (gap) logical file elements. Given the element list 600, the file constructor 250 can reconstruct the file by fetching the cached logical file elements and combining these cached elements with the gap elements in a manner defined, by the positions of each of the elements within the file.

Referring now to FIGS. 7, 8, and 9, the cache content of example embodiments is illustrated. As shown in FIG. 7, a parent cache 770, as maintained by a source system 110 can be used for storage of information and content related to each of the logical file elements of a file. Similarly, as shown in FIG. 8, a child cache 780, as maintained by a target system 120 can be used for storage of information and content related to each of the logical file elements of a file. In one embodiment, each of the parent cache 770 and child cache 780 can retain cacheable logical file elements of a particular file along with a unique component identifier for each logical file element. The unique component identifier can be used by the file constructor 250 to determine if the corresponding logical file element is resident in the child cache 780 and to fetch the data content of the logical file element from the child cache 780, if the logical file element is resident in the child cache 780. The unique component identifier can also be used by the file constructor 250 to fetch the data content of the logical file element from the parent cache 770, if the logical file element is not resident in the child cache 780.

The file transfer management system 200 of source system 110 may service multiple target systems 120, each running the file transfer management system 220. In other words, multiple remote (target) locations can run the software system provided on one source system 110 server). In this system configuration, a common parent cache 115 can be used to service multiple target systems 120. Similarly, a single file transfer management system 220 of a target system 120 may communicate with multiple source systems 110 running the file transfer management system 200. In other words, multiple source systems 110 can service one target system 120. In this system configuration, a common child cache 125 can be used to communicate with a plurality of source systems 110.

Referring now to FIG. 9, the cache content 790 of an alternative embodiment is illustrated. In the example shown in FIG. 9, a child cache 790, maintained by a target system 120, can be used for processing with a plurality of source systems 110. Given that the component identifier generated by a source system 110 may only be unique within that source system 110, the child cache 790 can include an additional data item for each logical file element that identifies the source system 110, which generated the component identifier. In this manner, the combination of the source system identifier and the component identifier will uniquely identify a particular logical file element across a plurality of source systems 110.

In an alternative embodiment, an additional step of using a unique hash of the entire file can be used to avoid sending any completely duplicate file more than once.

In another alternative embodiment, there may be sub-elements that could be cached distinctly. For example, in some file formats, an embedded font may contain only character definitions used by a given file. Therefore, both entire font files and also character definitions could be subject to caching. All data transport of elements can utilize data compression to further reduce network utilization.

Security of the content in the parent cache 115 and the child cache 125 may be of importance, as the portions of file content that are cached may contain sensitive information and should not be readily visible to computer users who might have access to the cache file storage. Therefore, cache encryption could be employed in the parent cache 115 and the child cache 125, as well as secure network and direct data connection data transfer techniques.

In an alternative embodiment, automated purging of cached data objects can be implemented. It is only known after the fact if a given logical file element that is cached is subject to reuse. An embodiment can utilize a 'last used' time stamp method, and remove logical file elements from the cache that are not used for some pre-determined length of time. This would prevent a cache from growing excessively large. Client caches should be synchronized with such cache updates. Client caches should be synchronized with server cache updates using any of a variety of conventional techniques.

The aggressiveness of the cache utilization can vary based on implementation parameters. For example, one remote location may have a fast connection to the server. Such a system might choose to only cache large images and fonts that exceed some pre-determined size, such as 100,000 bytes. Another remote location might have a slower connection, and wish to utilize the cache for all objects that exceed 1,000 bytes. Cache aggressiveness can also vary by time, so that during business hours, when file transfers would compete for network resources with users performing their regular duties, more aggressive caching policies can be implemented.

Various alternative embodiments can apply the techniques described herein. Using the embodiments as described herein, a client and server can recognize that a delivery of a file can be broken into steps, where the file source system provides a list of logically identified file elements, and the receiving system checks to see if those elements, from that server, exist locally before requesting them in a network access. A server-initiated notification method can be used, where a client maintains a persistent connection to a server to receive file element information from which to logically retrieve needed logical file components of the file. Likewise a client request can also be used, where a request for a file is fulfilled not by the file itself but instead by a recognizable header and element list data, so the client can utilize an embodiment and request only required logical file components of the file. An embodiment could, therefore, be embedded in enhanced versions of common file transfer protocols, such as LPD, FTP, HTTP, IPP, or even in network file system protocols such as NFS or SMB, or in custom protocols and methods designed to use the embodiments described herein.

In other alternative embodiments, the processing of the non-cacheable gap components can be performed either mainly by the source system or mainly by the target system. In one embodiment where the target system provides a sufficient level of processing power or where the network bandwidth between the source system and the target system is limited, the element list generated by the source system can include only information related to the cacheable components of a particular file and the length of the file. In this embodiment, the target system can determine where the gap elements of the file are located and insert the cacheable elements accordingly when reconstructing the file. In another embodiment where the target system provides a lower level of processing power or where the network bandwidth between the source system and the target system is at a high level, the source system can determine where the gap elements of the file are located. The source system can then generate the element list to include information related to both the cacheable and non-cacheable components of a particular file. In this embodiment, the target system needs less processing power to reconstruct the file from the cacheable and non-cacheable elements.

FIG. 10 is a processing flow diagram illustrating an example embodiment of a file transfer management system as described herein. The method 1001 of an example embodiment includes: initiating, by use of a processor, a transfer of a file from a source system to a target system (processing block 1010); identifying a format of the file (processing block 1020); deconstructing the file into a plurality of logical components based on the format of the file, the deconstructing including identifying a position of a logical component within the file, the plurality of logical components including at least one cacheable logical component and at least one non-cacheable gap component (processing block 1030); generating a plurality of component identifiers, each component identifier being unique to a particular logical component of the file (processing block 1040); storing the at least one cacheable logical component in a parent cache as indexed by the component identifier of the at least one cacheable logical component (processing block 1050); generating an element list including the component identifier of the at least one cacheable logical component, the position of the at least one cacheable logical component within the file, and information indicative of the at least one non-cacheable gap component within the file (processing block 1060); and delivering the element list to the target system (processing block 1070).

FIG. 11 is a processing flow diagram illustrating an example embodiment of a file transfer management system as described herein. The method 1101 of an example embodiment includes: receiving, by use of a processor, at a target system an element list comprising information related to a plurality of logical components corresponding to a file, the plurality of logical components including at least one cacheable logical component and at least one non-cacheable gap component, the element list including a component identifier of the at least one cacheable logical component, a position of the at least one cacheable logical component within the file, and information indicative of at least one non-cacheable gap component within the file (processing block 1110); determining if the at least one cacheable logical component is present in a child cache (processing block 1120); fetching the at least one cacheable logical component from the child cache using the component identifier, if the at least one cacheable logical component is present in the child cache (processing block 1130); fetching the at least one cacheable logical component from a source system cache using the component identifier, if the at least one cacheable logical component is not present in the child cache (processing block 1140); fetching the at least one non-cacheable gap component from the source system (processing block 1150); reconstructing the file by combining the fetched at least one cacheable logical component and the fetched at least one non-cacheable gap component using the element list information (processing block 1160); storing the at least one cacheable logical component into the child cache, if the at least one cacheable logical component is not present in the child cache (processing block 1170); and delivering the reconstructed file to a destination (processing block 1180).

Figure 12:
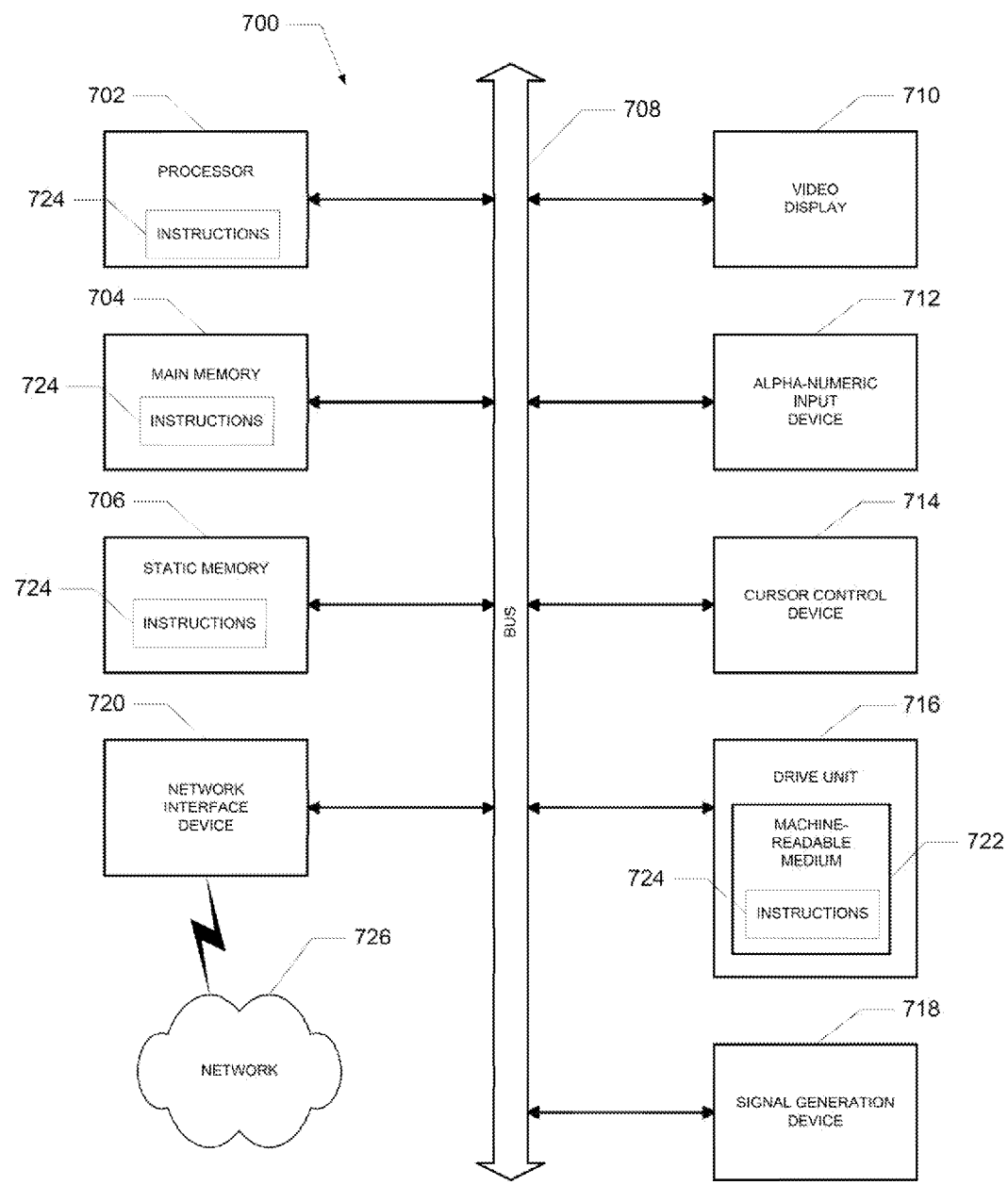
FIG. 12 shows a diagrammatic representation of machine in the example form of a computer system within which a set of instructions when executed may cause the machine to perform any one or more of the methodologies discussed herein.

FIG. 12 shows a diagrammatic representation of machine in the example form of a computer system 700 within which a set of instructions when executed may cause the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" can also be taken to include any collection of machines that individually or jointly execute a set (or multiple sets) of instructions to perform any one or more of the methodologies discussed herein.

The example computer system 700 includes a data processor 702 (e.g., a central processing unit (CPU), a graphics processing unit (GPU), or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an input device 712 (e.g., a keyboard), a cursor control device 714 (e.g., a mouse), a disk drive unit 716, a signal generation device 718 (e.g., a speaker) and a network interface device 720.

The disk drive unit 716 includes a non-transitory machine-readable medium 722 on which is stored one or more sets of instructions (e.g., software 724) embodying any one or more of the methodologies or functions described herein. The instructions 724 may also reside, completely or at least partially, within the main memory 704, the static memory 706, and/or within the processor 702 during execution thereof by the computer system 700. The main memory 704 and the processor 702 also may constitute machine-readable media. The instructions 724 may further be transmitted or received over a network 726 via the network interface device 720. While the machine-readable medium 722 is shown in an example embodiment to be a single medium, the term "machine-readable medium" should be taken to include a single non-transitory medium or multiple media (e.g., a centralized or distributed database, and/or associated caches and servers) that store the one or more sets of instructions. The term "machine-readable medium" can also be taken to include any non-transitory medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" can accordingly be taken to include, but not be limited to, solid-state memories, optical media, and magnetic media.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
   obtaining a file to be transferred from a source system to a target system;
   identifying a format of the file, the format defining logical components resident within the content of the file;
   selecting one or more deconstruction methods corresponding to the identified file format;
   deconstructing, by use of a processor, the file into a plurality of logical components using the selected one or more deconstruction methods based on the format of the file, the deconstructing including identifying a position and length of a logical component within the file, the plurality of logical components including a plurality of cacheable logical components and at least one non-cacheable gap component;
   generating a plurality of component identifiers for the cacheable logical components, the generating of the plurality of component identifiers including adding a value to each non-unique component identifier to ensure uniqueness of each component identifier, each component identifier uniquely identifying a different one of the plurality of logical components;
   storing the plurality of cacheable logical components in a parent cache of the source system as indexed by the component identifiers corresponding to the plurality of cacheable logical components;
   generating an element list including the component identifiers corresponding to the plurality of cacheable logical components within the file, the position and length of each of the plurality of cacheable logical components within the file, and the length of the file;
   delivering the element list to the target system;
   causing the target system to fetch any of the plurality of cacheable logical components from a child cache of the target system using the corresponding component identifiers and causing the target system to not transfer from the source system any of the cacheable logical components fetched from the child cache of the target system;
   causing the target system to fetch any of the plurality of cacheable logical components from the parent cache of the source system using the corresponding component identifiers, if any of the plurality of cacheable logical components is not present in the child cache of the target system based on the corresponding component identifiers; and
   causing the target system to fetch the at least one non-cacheable gap component from the source system.

2. The method as claimed in claim 1 wherein the plurality of component identifiers are generated using a hash process.

3. The method as claimed in claim 1 wherein the parent cache is maintained by the source system.

4. The method as claimed in claim 1 wherein the element list includes information indicative of a classification as to whether a particular logical component is cacheable or non-cacheable.

5. The method as claimed in claim 1 wherein the element list includes a component identifier corresponding to a particular logical component.

6. The method as claimed in claim 1 wherein the element list includes information indicative of a source system identifier corresponding to a particular logical component.

7. The method as claimed in claim 1 wherein the source system is further configured to determine where the at least one non-cacheable gap component is located within the file.

8. A method comprising:
   receiving, by use of a processor, at a target system an element list comprising information related to a plurality of logical components deconstructed from a file based on the format of the file, the format defining logical components resident within the content of the file, the format also defining one or more deconstruction methods used to deconstruct the file, the deconstructing including identifying a position and length of a logical component within the file, the plurality of logical components including a plurality of cacheable logical components and at least one non-cacheable gap component, the element list including a plurality of component identifiers for the cacheable logical components, the plurality of component identifiers including a value added to the component identifier to ensure uniqueness of the component identifier at a source system, each component identifier uniquely identifying a different one of the plurality of logical components;
   fetching any of the plurality of cacheable logical components from a child cache of the target system using the corresponding component identifiers and causing the target system to not transfer from the source system any of the cacheable logical components fetched from the child cache of the target system;
   fetching any of the plurality of cacheable logical components from a parent cache of the source system using the corresponding component identifiers, if any of the plurality of cacheable logical components is not present in the child cache of the target system based on the corresponding component identifiers;
   fetching the at least one non-cacheable gap component from the source system;
   reconstructing the file by combining the fetched plurality of cacheable logical components and the fetched at least one non-cacheable gap component using the element list information;
   storing the plurality of cacheable logical components into the child cache, if the plurality of cacheable logical components are not present in the child cache; and
   delivering the reconstructed file to a destination.

9. The method as claimed in claim 8 wherein the plurality of component identifiers are generated using a hash process.

10. The method as claimed in claim 8 wherein the child cache is maintained by the target system.

11. The method as claimed in claim 8 wherein the element list includes information indicative of a classification as to whether a particular logical component is cacheable or non-cacheable.

12. The method as claimed in claim 8 wherein the element list includes a component identifier corresponding to a particular logical component.

13. The method as claimed in claim 8 wherein the element list includes information indicative of a source system identifier corresponding to a particular logical component.

14. The method as claimed in claim 8 wherein the target system is further configured to determine where the at least one non-cacheable gap component is located within the file.

15. A system, comprising:
   a data processor;
   a cache, in data communication with the processor, for storage of logical components and related information; and a transfer management module, executable by the processor, to:
obtain a file to be transferred from a source system to a target system;
identify a format of the file, the format defining logical components resident within the content of the file;
select one or more deconstruction methods corresponding to the identified file format;
deconstruct the file into a plurality of logical components using the selected one or more deconstruction methods based on the format of the file, the deconstructing including identifying a position and length of a logical component within the file, the plurality of logical components including a plurality of cacheable logical components and at least one non-cacheable gap component;
generate a plurality of component identifiers for the cacheable logical components, the transfer management module being further configured to add a value to each non-unique component identifier to ensure uniqueness of each component identifier, each component identifier uniquely identifying a different one of the plurality of logical components;
store the plurality of cacheable logical components in a parent cache of the source system as indexed by the component identifiers corresponding to the plurality of cacheable logical components;
generate an element list including the component identifiers corresponding to the plurality of cacheable logical components within the file, the position and length of each of the plurality of cacheable logical components within the file, and the length of the file;
deliver the element list to the target system;
cause the target system to fetch any of the plurality of cacheable logical components from a child cache of the target system using the corresponding component identifiers and cause the target system to not transfer from the source system any of the cacheable logical components fetched from the child cache of the target system;
cause the target system to fetch any of the plurality of cacheable logical components from the parent cache of the source system using the corresponding component identifiers, if any of the plurality of cacheable logical components is not present in the child cache of the target system based on the corresponding component identifiers; and
cause the target system to fetch the at least one non-cacheable gap component from the source system.

16. The system as claimed in claim 15 wherein the plurality of component identifiers are generated using a hash process.

17. The system as claimed in claim 15 wherein the parent cache is maintained by the source system.

18. The system as claimed in claim 15 wherein the element list includes information indicative of a classification as to whether a particular logical component is cacheable or non-cacheable.

19. The system as claimed in claim 15 wherein the element list includes a component identifier corresponding to a particular logical component.

20. The system as claimed in claim 15 wherein the element list includes information indicative of a source system identifier corresponding to a particular logical component.

21. A method comprising:
obtaining a file to be transferred from a source system to a target system;
identifying a format of the file, the format defining logical components resident within the content of the file;
selecting one or more deconstruction methods corresponding to the identified file format;
deconstructing, by use of a processor, the file into a plurality of logical components using the selected one or more deconstruction methods based on the format of the file, the deconstructing including identifying a position and length of a logical component within the file, the plurality of logical components including a plurality of cacheable logical components and at least one non-cacheable gap component;
generating a plurality of component identifiers for the cacheable logical components, the generating of the plurality of component identifiers including adding a value to each non-unique component identifier to ensure uniqueness of each component identifier, each component identifier uniquely identifying a different one of the plurality of logical components;
storing the plurality of cacheable logical components in a parent cache of the source system as indexed by the component identifiers corresponding to the plurality of cacheable logical components;
generating an element list including the component identifiers corresponding to the plurality of cacheable logical components within the file, the position and length of each of the plurality of cacheable logical components within the file, and information indicative of the at least one non-cacheable gap component within the file;
delivering the element list to the target system;
causing the target system to fetch any of the plurality of cacheable logical components from a child cache of the target system using the corresponding component identifiers and causing the target system to not transfer from the source system any of the cacheable logical components fetched from the child cache of the target system;
causing the target system to fetch any of the plurality of cacheable logical components from the parent cache of the source system using the corresponding component identifiers, if any of the plurality of cacheable logical components is not present in the child cache of the target system based on the corresponding component identifiers; and
causing the target system to fetch the at least one non-cacheable gap component from the source system.

22. A method comprising:
obtaining a plurality of files to be transferred from a source system to a target system;
identifying a format of each of the plurality of files, the format defining logical components resident within the content of the file;
selecting one or more deconstruction methods corresponding to the identified file format for each of the plurality of files;
deconstructing, by use of a processor, each file of the plurality of files into a plurality of logical components using the selected one or more deconstruction methods based on the format of the corresponding file, the deconstructing including identifying a position and length of a logical component within a particular file of the plurality of files, the plurality of logical components including a plurality of re-useable logical components and at least one non-re-useable logical component;
generating a plurality of component identifiers corresponding to the plurality of re-useable logical components, the generating of the plurality of component identifiers including adding a value to each non-unique component identifier to ensure uniqueness of each component identifier, each component identifier uniquely identifying a different one of the plurality of logical components;

storing the plurality of re-useable logical components in a data repository as indexed by the component identifiers corresponding to the plurality of re-useable logical components;

generating an element list including the component identifiers corresponding to the plurality of re-useable logical components, the position and length of each of the plurality of re-useable logical components within the file, information indicative of the at least one non-re-useable logical component within the file, and the data repository;

delivering the element list to the target system; and causing the target system to fetch the at least one re-useable logical component from the data repository using the corresponding component identifier.

* * * * *